United States Patent
Ruppert, Jr.

[11] Patent Number: 5,687,973
[45] Date of Patent: Nov. 18, 1997

[54] DUST SEAL FOR PINION BEARING HOUSING

[75] Inventor: Malcolm F. Ruppert, Jr., Hebron, Ohio

[73] Assignee: Rockwell Heavy Vehicle Systems, Inc., Troy, Mich.

[21] Appl. No.: 669,077

[22] Filed: Jun. 24, 1996

[51] Int. Cl.⁶ .................................................. F16J 15/32
[52] U.S. Cl. ........................ 277/67; 277/68; 277/133; 277/134; 277/152; 384/478; 384/482; 384/484
[58] Field of Search ........................... 277/67, 68, 133, 277/134, 152; 384/478, 484, 482

[56] References Cited

U.S. PATENT DOCUMENTS

| | | | |
|---|---|---|---|
| 3,679,278 | 7/1972 | Lucas | 277/67 |
| 4,384,387 | 5/1983 | Pachuta | 16/107 |
| 4,898,082 | 2/1990 | Pottorff | 277/152 |
| 5,005,992 | 4/1991 | Dreschmann et al. | 384/482 |
| 5,024,449 | 6/1991 | Oho | 277/152 |
| 5,141,339 | 8/1992 | Evans | 384/147 |
| 5,344,163 | 9/1994 | Roll et al. | 277/67 |
| 5,409,240 | 4/1995 | Ballard | 277/38 |

Primary Examiner—William A. Cuchlinski, Jr.
Assistant Examiner—Christina Annick

[57] ABSTRACT

A seal is provided on a slinger for a pinion shaft in an axle housing. The seal provides sealing contact at a location between the bearing cage and the slinger. The slinger prevents relatively large dirt, stones, and debris particles from reaching an inner oil seal. The seal on the slinger prevents smaller particles from reaching the oil seal. Several embodiments of the seal are disclosed.

18 Claims, 2 Drawing Sheets

5,687,973

DUST SEAL FOR PINION BEARING HOUSING

BACKGROUND OF THE INVENTION

This invention relates to a dust seal or shield that protects an oil seal within a pinion bearing cage.

In the prior art, pinion bearing cages or housings mount a pinion gear that provides rotational drive to an axle. The pinion gear extends through the bearing cage, and is supported on bearings within the cage. The interior of the bearing cage or housing is supplied with oil to insure proper operation of the components.

An outer seal is provided to keep the oil within the bearing cage. Complex seals such as triple lip seals are typically utilized to provide an effective oil seal between the relatively rotating spindle shaft and bearing cage.

There are extreme differences between the interior of such bearing cages and the exterior environment in which the axle resides. That is, the interior of the bearing cage is typically relatively clean. The exterior of an axle is subject to very harsh environmental factors. As examples, rocks, mud, snow, ice, dirt, etc., are found in the vicinity of the axle housing, particularly beneath heavy vehicles.

The rocks and dirt have damaged the relatively delicate oil seal. To address this damage, slingers have been mounted on the pinion gear shaft just outside of the bearing cage. The slinger is a metal cup that rotates with the pinion shaft, and prevent large dirt, debris, stones, etc., from reaching the seal. Slingers do provide good protection to the oil seal. However, smaller dust and dirt particles still sometimes reach the seal. These particles have sometimes caused damage to the oil seal and an undesirably short seal life.

SUMMARY OF THE INVENTION

This invention relates to a seal between a metal slinger and the bearing cage. The seal is preferably mounted to a metal slinger which is in turn mounted to rotate with a pinion shaft. The metal slinger is preferably positioned slightly axially outwardly of a bearing cage into which the pinion shaft extends. The bearing cage also receives a relatively delicate oil seal at an outer end which seals the relatively rotating surfaces between the pinion shaft and the bearing cage. The slinger seal between the slinger and the bearing cage prevents exterior dirt and debris from reaching this internal oil seal. The internal oil seal is configured to prevent oil from leaving the bearing cage. The exterior slinger seal is designed to prevent dirt and debris from reaching the interior oil seal. As such, the two seals provide distinct functions, with the outer slinger seal protecting the inner oil seal.

The slinger seal preferably has a free position wherein opposed seal lips are spaced by an inner peripheral distance that is less than the outer peripheral diameter of the bearing cage which is to receive the seal. In this way, once the slinger and seal are received on the bearing cage, the seal is deformed by the bearing cage insuring a good seal. Preferably, the slinger has a shroud that extends axially over an outer peripheral portion of the bearing cage. The seal extends radially inwardly from this shroud to contact the outer peripheral surface of the bearing cage.

In preferred embodiments of this invention, the slinger seal may be provided with fan blades that create an air flow away from the sealing surface between the slinger seal and the bearing cage. This will further prevent any dirt or debris from reaching the interior oil seal. In further features, the exterior slinger seal may include additional sealing lips. In one example, a slinger seal includes two sealing lips.

These and other features of the present invention are best understood from the following specification and drawings, of which the following is a brief description.

DETAILED DESCRIPTION OF THE PREFERRED EMBODIMENT

Figure 1:
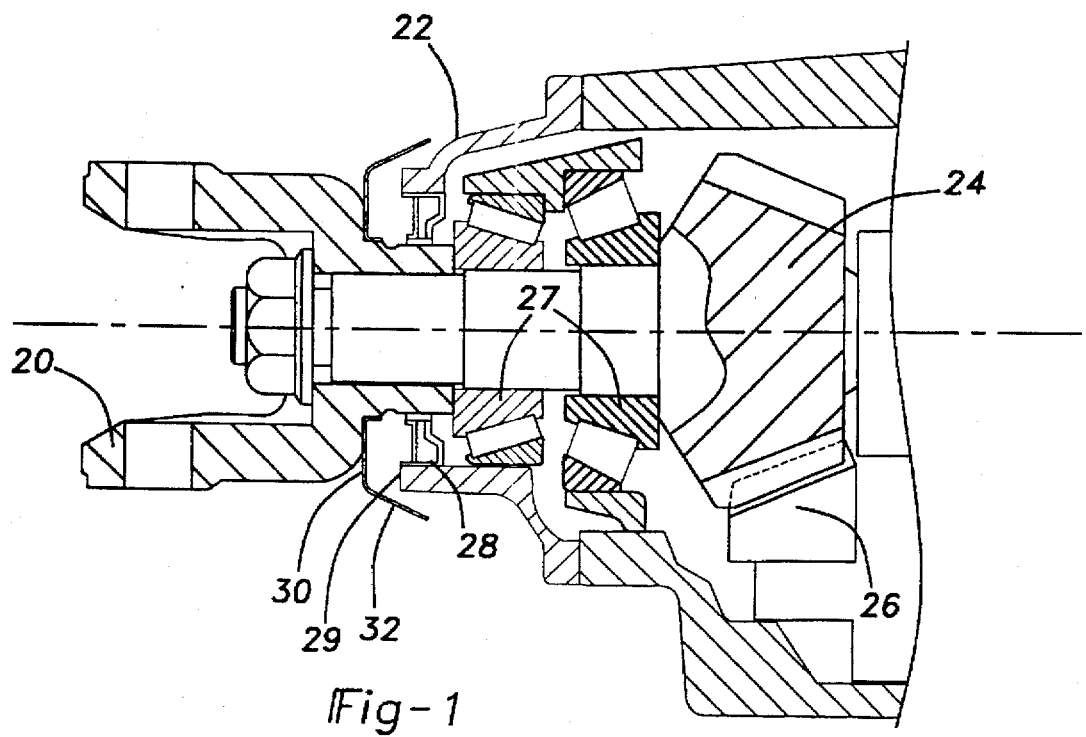
FIG. 1 is a view of the prior art pinion shaft and gear housing.

FIG. 1 shows a pinion shaft 20 extending into a pinion bearing cage 22. As is known, a gear 24 is driven to in turn drive gear 26, and drive an axle. Bearings 27 are positioned between the bearing cage and the pinion shaft 20. Oil is deposited within the bearing cage to insure the proper functioning between the shafts and gears within the bearing cage 22. An oil seal 28 (shown schematically) is positioned at an outer end 29 of the bearing cage 22. This oil seal may be a relatively delicate triple lip seal, of the type known in the art for this application.

To protect the seal, the prior art has utilized a slinger 30, which is typically a metal cup having a forward extending shroud 32 which extends over the outer end 29 of the housing 22. This shroud 32 prevents relatively large dirt, stones, or other particles from reaching the seal 28. Thus, the slinger 30 does protect the seal 28.

Figure 2:
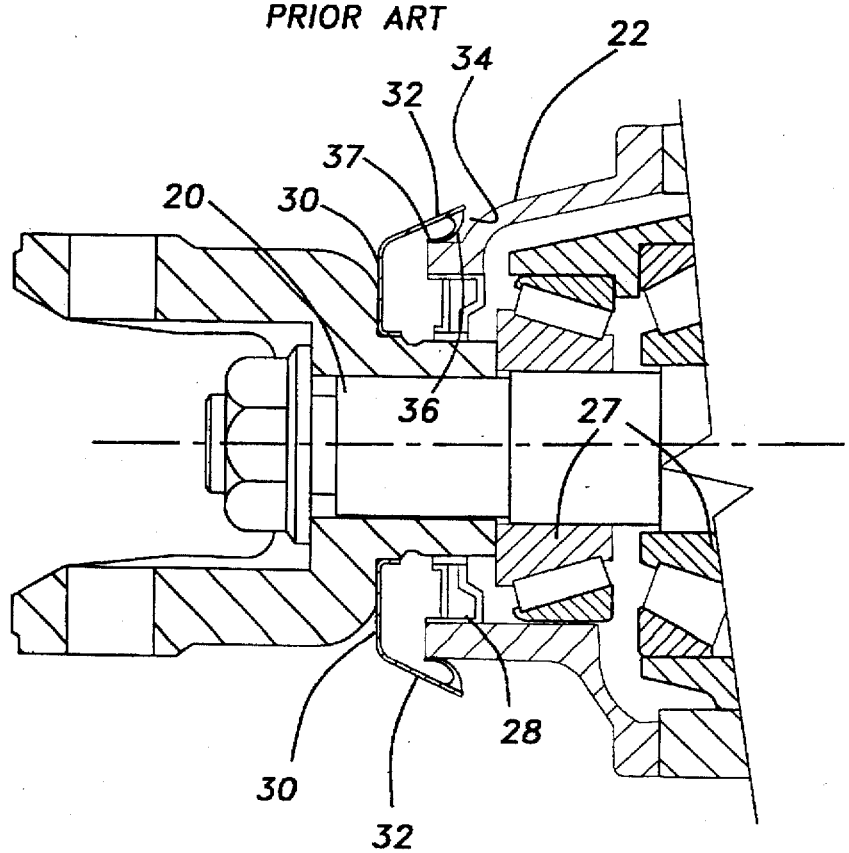
FIG. 2 shows the inventive seal incorporated into the pinion bearing cage.

However, in the prior art, relatively small particles have sometimes reached and damaged the seal 28. For that reason, the present invention incorporates a slinger seal 34 as shown in FIG. 2. Slinger seal 34 has a sealing lip 36 which seals against an outer surface 37 of the bearing housing 22. The seal 34 may be molded of rubber or polytetraflouretylene or other materials having relatively good sliding characteristics. The seal 34 is preferably cylindrical and surrounds the entire circumference of the bearing cage. During operation, the spindle shaft 20, slinger 30, and hence, seal 34, all rotate relative to the bearing cage 22. For that reason, it is desirable to decrease frictional resistance between the seal 34 and the bearing cage 22. In one application, the outer surface 37 is provided with a wear resistant surface that will increase the resistance of the bearing cage 22 to any sliding friction, or wear from the sliding seal 34.

Figure 3:
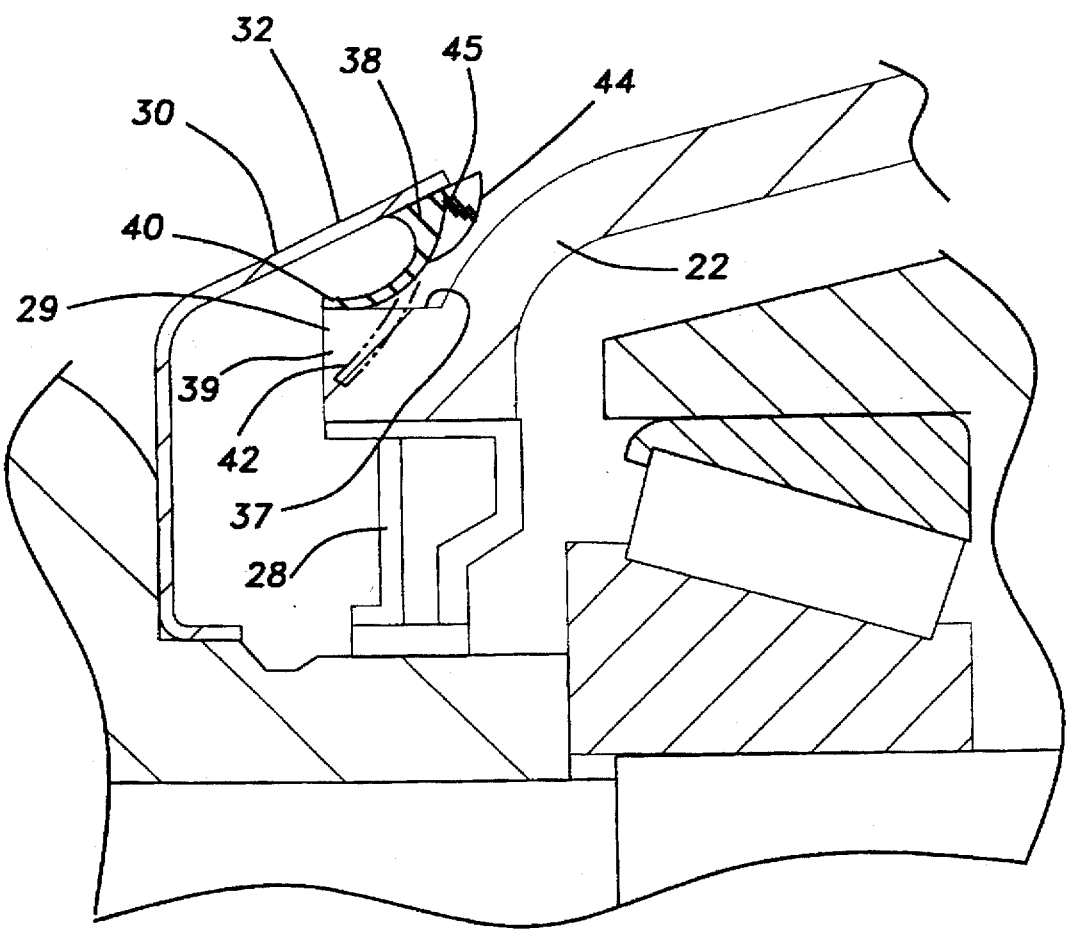
FIG. 3 shows a second embodiment seal.

As shown in FIG. 3, a second embodiment seal 38 may incorporate a sealing lip 40. In all of the embodiments, the sealing lip has a free position such as shown generally in phantom at 42. The outer surface 37 of the bearing cage 22 has an outer diameter that is greater than the inner diameter between the sealing lip 42. As such, when the sealing lip is placed onto the bearing cage 22, it is deformed to the position as shown in solid line, providing a good seal. As can be seen clearly in FIGS. 2, 3 or 4, an inner lip of the seals is deformed such that it extends more toward an outer end of the housing from an initial contact portion. That is, the inner lip is bent toward the outer end of the housing, and also toward the slinger. As shown in FIG. 3, the seal 38 is mounted to the slinger 30 at an axial location over the outer end 29 of the bearing cage 22, but is deformed axially towards that end 29 to provide its seal.

In the embodiment shown in FIG. 3, fan blades 44 are formed at spaced locations on a back 45 of the seal 38. The fan blades cause air flow away from the sealing location on the bearing cage 22 when the seal 38 is rotated. This will further prevent small dirt and dust particles from reaching the sealing area.

Figure 4:
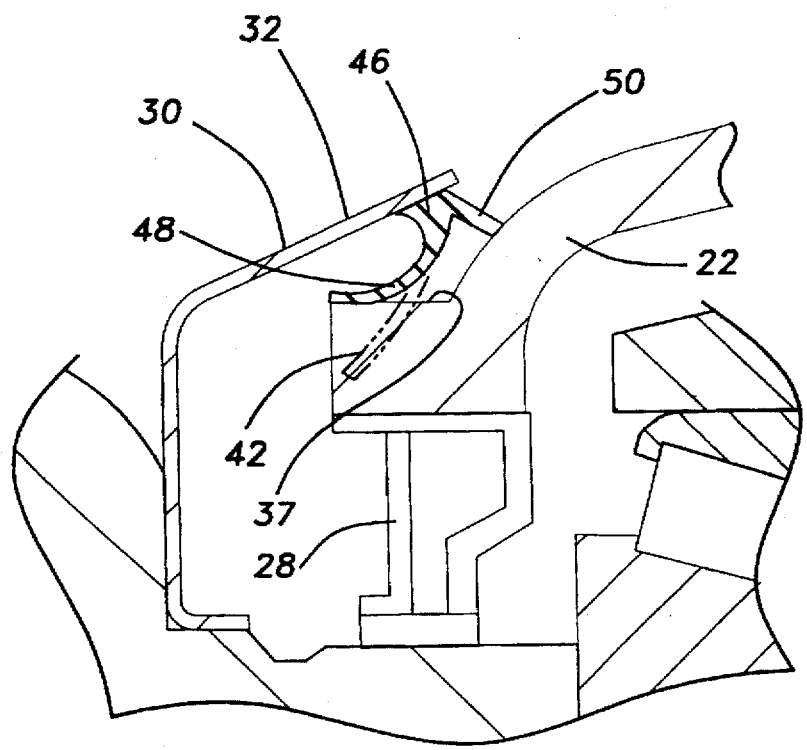
FIG. 4 shows a third embodiment seal.

In an embodiment shown in FIG. 4, the seal 46 includes a primary sealing lip 48 as is shown in the above embodiments, and a secondary sealing lip 50. Secondary sealing lip 50 is also generally cylindrical, and seals the bearing cage 22 about its entire circumference.

Preferred embodiments of this invention have been disclosed, however, a worker of ordinary skill in the art would recognize that certain modifications would come within the scope of this invention. For that reason, the following claims should be studied to determine the true scope and content of this invention.

I claim:

1. A pinion gear and housing arrangement comprising:
   a pinion gear having a shaft and gear teeth at an inner end of said shaft;
   a bearing housing having an opening at an outer end, said pinion shaft extending into said opening, and said gear teeth being received within said pinion housing;
   an oil seal placed between an outer diameter of said pinion shaft and an inner diameter of said housing adjacent said outer end and in said opening;
   a slinger positioned axially outwardly of said opening and secured to rotate with said pinion shaft, and
   a slinger seal secured to rotate with said slinger, and extending radially inwardly from said slinger to contact said bearing housing.

2. An arrangement as recited in claim 1, wherein said slinger seal contacts an outer peripheral surface of said bearing housing.

3. An arrangement as recited in claim 2, wherein said slinger extends axially inwardly and radially outwardly over said outer peripheral surface of said bearing housing, and said slinger seal extending radially inwardly to contact an outer peripheral surface of said bearing housing.

4. An arrangement as recited in claim 3, wherein said slinger seal includes a plurality of seal lips each contacting said bearing housing.

5. An arrangement as recited in claim 3, wherein said slinger seal is provided with a plurality of extensions extending axially inwardly from a main seal body, said extensions providing air flow when said seal is rotated.

6. An arrangement as recited in claim 3, wherein said outer peripheral surface of said bearing housing is provided with a wear resistant coating or surface.

7. An arrangement as recited in claim 1, wherein said slinger seal is molded from polytetraflourethylene.

8. An arrangement as recited in claim 1, wherein said slinger seal is molded from rubber.

9. An arrangement as recited in claim 1, wherein said slinger seal is provided with a plurality of sealing lips each contacting said bearing housing.

10. An arrangement as recited in claim 1, wherein said slinger seal is provided with a main seal body, and the plurality of extension members extending from said main seal body in an axial direction over said bearing housing, said extensions providing air flow when said seal is rotated.

11. An arrangement as recited in claim 1, wherein a wear surface is provided on said bearing housing at a location where said seal will contact said bearing housing.

12. A pinion gear and housing arrangement comprising:
    a pinion gear having a shaft and gear teeth at an inner end of said shaft;
    a bearing housing having an opening at an outer end, said pinion shaft extending into said opening, and said gear teeth being received within said pinion housing;
    an oil seal placed between an outer diameter of said pinion shaft and an inner diameter of said housing adjacent said outer end and in said opening;
    a slinger positioned axially outwardly of said opening and having a shroud extending over a portion of said housing defining said opening, said slinger secured to rotate with said pinion shaft;
    a slinger seal secured to rotate with said slinger and extending radially inwardly from said slinger to contact an outer peripheral surface of said housing; and
    said slinger seal extends radially inwardly for a first distance such that an inner portion of said seal defines an inner diameter, said inner diameter being less than an outer diameter of said housing on which said seal is to contact, such that said seal is deformed when received on said housing, said slinger seal contacting said outer peripheral surface of said housing at a contact position spaced from said outer end and an inner lip of said seal being deformed toward said outer end from said contact position.

13. An arrangement as recited in claim 12, wherein said slinger seal is provided with a plurality of sealing lips each contacting said housing.

14. An arrangement as recited in claim 12, wherein said slinger seal is provided with a plurality of extensions extending axially inwardly from a main seal body, said extensions providing air flow when said seal is rotated.

15. A slinger for use on a pinion shaft comprising:
    a radially outwardly extending first portion, and an axially extending shroud portion extending axially and radially from said radially extending portion, said shroud portion having a seal adjacent an axially extreme end, said seal extending radially inwardly from said shroud portion; and
    said seal being provided with a plurality of extension extending from away from a main seal body, said extensions providing air flow when said seal is rotated.

16. A slinger as recited in claim 15, wherein said seal extends radially inwardly for a first distance such that the inner portion of said seal defines an inner diameter of said seal, said inner diameter being less than an outer peripheral diameter of a housing said seal is to contact, such that said seal is deformed when received on the housing.

17. A slinger as recited in claim 15, wherein said seal is provided with a plurality of sealing lips.

18. A slinger as recited in claim 17, wherein each of said plurality of sealing lips are generally cylindrical.

* * * * *